United States Patent
Keese et al.

(10) Patent No.: US 8,969,222 B2
(45) Date of Patent: Mar. 3, 2015

(54) MODIFIED PERFLUOROPOLYMER SHEET MATERIAL AND METHODS FOR MAKING SAME

(75) Inventors: Frank M. Keese, Cambridge, NY (US); Robert G. Pleydon, Worcester, MA (US); Anne B. Hardy, Acton, MA (US); Hua Fan, Tyngsboro, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 940 days.

(21) Appl. No.: 12/641,972

(22) Filed: Dec. 18, 2009

(65) Prior Publication Data

US 2010/0159223 A1 Jun. 24, 2010

Related U.S. Application Data

(60) Provisional application No. 61/139,946, filed on Dec. 22, 2008, provisional application No. 61/243,926, filed on Sep. 18, 2009.

(51) Int. Cl.
| | |
|---|---|
| *B32B 27/24* | (2006.01) |
| *B32B 27/30* | (2006.01) |
| *B32B 5/02* | (2006.01) |
| *B32B 17/02* | (2006.01) |

(52) U.S. Cl.
USPC ............. 442/148; 442/59; 442/157; 442/172; 442/180

(58) Field of Classification Search
USPC ............................ 442/59, 172, 180, 157, 148
See application file for complete search history.

(56) References Cited

U.S. PATENT DOCUMENTS

| | | | |
|---|---|---|---|
| 3,765,932 A | 10/1973 | Kokubo et al. | |
| 4,210,697 A | 7/1980 | Adiletta | |
| 4,298,416 A | 11/1981 | Casson et al. | |
| 4,339,553 A | 7/1982 | Yoshimura et al. | |
| 4,347,268 A | 8/1982 | Close | |
| 4,370,376 A | 1/1983 | Gangal et al. | |
| 4,503,179 A | 3/1985 | Yoshimura et al. | |
| 4,504,528 A | 3/1985 | Zucker et al. | |
| 4,962,136 A | 10/1990 | Peters | |
| 5,182,151 A | 1/1993 | Furuta et al. | |
| 5,194,335 A | 3/1993 | Effenberger et al. | |
| 5,230,937 A * | 7/1993 | Effenberger et al. | 428/113 |
| 5,368,924 A * | 11/1994 | Merrill et al. | 442/72 |
| 5,720,703 A | 2/1998 | Chen et al. | |
| 6,133,373 A | 10/2000 | Kirochko et al. | |
| 6,169,139 B1 | 1/2001 | Van Cleeff | |

(Continued)

FOREIGN PATENT DOCUMENTS

| | | |
|---|---|---|
| EP | 0955211 A2 | 11/1999 |
| EP | 1261480 B1 | 10/2004 |

(Continued)

OTHER PUBLICATIONS

International Search Report from PCT/US2010/043076 dated Apr. 22, 2012, 1. pg.

*Primary Examiner* — Lynda Salvatore
(74) *Attorney, Agent, or Firm* — Abel Law Group, LLP; Chi Suk Kim (57) ABSTRACT

A coated fabric includes a reinforcement, a first coating disposed on the reinforcement, and a second coating disposed on the first coating. The first coating includes perfluoropolymer. The second coating includes perfluoropolymer and a silicone polymer in an amount in a range of 2 wt % to 30 wt %.

21 Claims, 2 Drawing Sheets

(56) References Cited

U.S. PATENT DOCUMENTS

| | | | |
|---|---|---|---|
| 6,379,806 B1 | 4/2002 | Takamura et al. | |
| 6,664,336 B1 | 12/2003 | Tomihashi et al. | |
| 6,720,381 B1 | 4/2004 | Tomihashi et al. | |
| 6,764,763 B1 | 7/2004 | Tomihashi et al. | |
| 6,794,550 B2 | 9/2004 | Hintzer et al. | |
| 6,930,063 B2 * | 8/2005 | Keese | 442/67 |
| 7,238,102 B2 | 7/2007 | Goupil | |
| 7,247,673 B2 * | 7/2007 | Pinter et al. | 524/588 |
| 7,271,209 B2 | 9/2007 | Li et al. | |
| 7,407,899 B2 | 8/2008 | Wang et al. | |
| 7,485,588 B2 | 2/2009 | Wang et al. | |
| 2002/0193500 A1 | 12/2002 | Hintzer et al. | |
| 2004/0214944 A1 | 10/2004 | Tomihashi et al. | |
| 2004/0229043 A1 | 11/2004 | Spohn et al. | |
| 2005/0001351 A1 | 1/2005 | Yoshida | |
| 2005/0282023 A1 | 12/2005 | Comeaux et al. | |
| 2006/0084743 A1 | 4/2006 | Chen | |
| 2006/0122325 A1 | 6/2006 | Wenz et al. | |
| 2009/0042038 A1 | 2/2009 | Okuya et al. | |

FOREIGN PATENT DOCUMENTS

| | | |
|---|---|---|
| GB | 997096 A | 6/1965 |
| GB | 1415374 A | 11/1975 |
| JP | 2001-315248 A | 11/2001 |
| KR | 1020070051307 A | 5/2007 |
| WO | 9015898 A1 | 12/1990 |
| WO | 0022041 | 4/2000 |
| WO | 2007140091 A1 | 12/2007 |

* cited by examiner

MODIFIED PERFLUOROPOLYMER SHEET MATERIAL AND METHODS FOR MAKING SAME

CROSS-REFERENCE TO RELATED APPLICATION(S)

The present application claims priority from U.S. Provisional Patent Application No. 61/139,946, filed Dec. 22, 2008, entitled "MODIFIED PERFLUOROPOLYMER SHEET MATERIAL AND METHODS FOR MAKING SAME," naming inventors Frank M. Keese and Robert G. Pleydon and claims priority from U.S. Provisional Patent Application No. 61/243,926, filed Sep. 18, 2009, entitled "MODIFIED PERFLUOROPOLYMER SHEET MATERIAL AND METHODS FOR MAKING SAME," naming inventors Frank M. Keese, Robert G. Pleydon, Anne B. Hardy, and Hua Fan, which applications are incorporated by reference herein in their entirety.

FIELD OF THE DISCLOSURE

This disclosure, in general, relates to elastomer modified perfluoropolymer sheet materials.

BACKGROUND

Fabric reinforced polytetrafluoroethylene (PTFE) composites are employed in a variety of industries. In general, such composites are known to be resistant to the accumulation of dirt and grime and have a low coefficient of friction. However, conventional reinforced PTFE composites generally have a firm hand and drape. In other words, conventional reinforced PTFE composites are stiff and springy and cannot be formed into compound or double curve shapes without wrinkling or creasing. Furthermore, such conventional composites can have little sound dampening capability and can rattle and pop when deformed.

Other conventional solutions have attempted to coat the reinforced PTFE composite with an elastomer. However, such solutions add expense and process complexity. In addition, such solutions are difficult to produce with consistent quality.

As such, an improved sheet material would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, the sheet material includes a blend of a perfluoropolymer and a silicone polymer. The silicone polymer forms about 2 wt % to about 30 wt % of the blend. The sheet material can include additional layers. For example, the sheet material can include a reinforcement layer. The reinforcement layer can include a fibrous material, such as a PTFE coated fiberglass material. In another example, the sheet material is a standalone sheet material without additional layers or reinforcement.

In an embodiment, the sheet material can be formed by coating a carrier with a polymer dispersion. The dispersion includes a perfluoropolymer and silicone polymer in an amount of 2% to 30% by weight based on the total weight of the solids in the dispersion. The dispersion can be an aqueous dispersion. Once the carrier is coated with the dispersion, the coating can be dried and sintered or fused. In an example, the carrier includes a reinforcement material that is incorporated into the sheet material upon sintering or fusing of the coating. In another example, the carrier is detachable from the sheet material formed of the coating material, resulting in a sheet material absent reinforcement.

Figure 1:
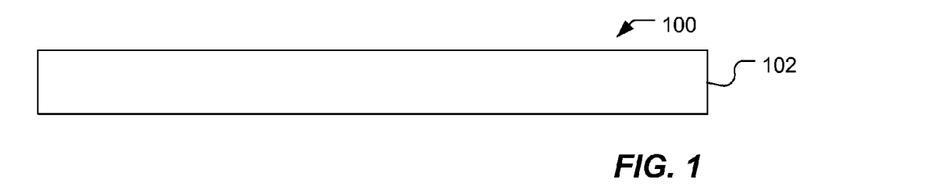
FIG. 1, FIG. 2, FIG. 3, and FIG. 4 include illustrations of exemplary sheet materials.

In an embodiment, the sheet material is a standalone sheet material absent reinforcement. For example, the sheet material 100 illustrated in FIG. 1 includes a layer 102 formed of a blend of perfluoropolymer and silicone polymer. As illustrated, the material 100 is free of reinforcement. Alternatively, additional layers can be disposed on either major surface of the layer 102.

In an example, the blend includes a fluorinated polymer. The fluorinated polymer can be a homopolymer of fluorine-substituted monomers or a copolymer including at least one fluorine-substituted monomer. Exemplary fluorine substituted monomers include tetrafluoroethylene (TFE), vinylidene fluoride (VF2), hexafluoropropylene (HFP), chlorotrifluoroethylene (CTFE), perfluoroethylvinyl ether (PEVE), perfluoromethylvinyl ether (PMVE), and perfluoropropylvinyl ether (PPVE). Examples of fluorinated polymers include polytetrafluoroethylene (PTFE), perfluoroalkylvinyl ether (PFA), fluorinated ethylene-propylene copolymer (FEP), ethylene tetrafluoroethylene copolymer (ETFE), polyvinylidene fluoride (PVDF), polychlorotrifluoroethylene (PCTFE), and TFE copolymers with VF2 or HFP. In particular, the blend includes a perfluoropolymer, such as PTFE, polyhexafluoropropylene (HFP), fluorinated ethylene propylene (FEP), perfluoroalkylvinyl (PFA), or any combination thereof. In a particular example, the perfluoropolymer includes polytetrafluoroethylene (PTFE). In an embodiment, the perfluoropolymer is derived from a dispersion, such as an aqueous dispersion.

The silicone polymer can include a polysiloxane. For example, the silicone polymer can include a polyalkylsiloxane, a phenylsilicone, a fluorosilicone, or any combination thereof. In an example, a polyalkysiloxane includes a polydimethylsiloxane, a polydipropylsiloxane, a polymethylpropylsiloxane, or any combination thereof. In particular, the silicone polymer can be derived from an aqueous dispersion of precured silicone polymers. In an example, the silicone polymer can be derived from an aqueous dispersion and can include precured silicone with terminal end groups that undergo condensation reaction during drying. In particular, the silicone polymer can be derived from an aqueous dispersion of precured silicone with terminal groups or additives, such as cross-linkers, that undergo a condensation reaction when dried. For example, the silicone polymer can be selected from a silicone polymer dispersion available from Wacker-Chemie GmbH, Munchen, Germany, such as the Wacker CT27E silicone rubber dispersion, available from Dow Corning, such as Additive 84, or available from Shin Etsu, such as Polon MF 56.

The blend can include silicone polymer in an amount in a range of 2 wt % to 30 wt % based on the total weight of the fused blend. For example, the blend can include silicone polymer in an amount in a range of 5 wt % to 30 wt %, such as a range of 10 wt % to 30 wt %, or even a range of 15 wt % to 20 wt %. In addition, the blend can include fluoropolymer, such as perfluoropolymer, in an amount in a range of 70 wt % to 98 wt %, such as a range of 75 wt % to 90 wt %, or even a range of 80 wt % to 85 wt %.

Optionally, the blend can include fillers. For example, the blend can include fillers, light stabilizers, pigments, and bonding aids. Exemplary fillers include talc, silica, and calcium carbonate. Exemplary light absorbing additives and pigments include $TiO_2$, $Fe_2O_3$, carbon black, and calcined mixed metal oxides. Such fillers can be included in the blend in an amount not greater than 60 wt %, such as not greater than 40 wt %, not greater than 15 wt %, or even not greater than 5 wt %.

Figure 2:
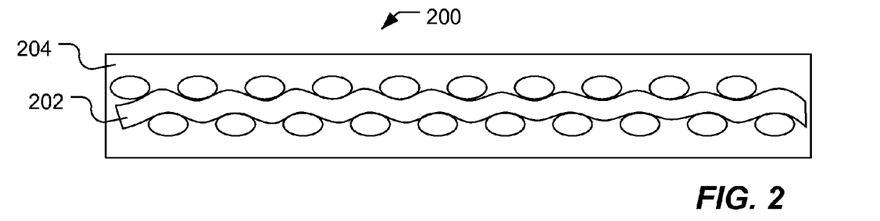

In another embodiment, the sheet material can include a reinforcement. For example, as illustrated in FIG. 2, a sheet material 200 includes a reinforcement layer 202. A layer 204 formed of a blend of perfluoropolymer and silicone polymer, such as the blend described above, is disposed on the reinforcement layer 202. For example, layer 204 can contact the reinforcement layer 202 directly without intervening layers, such as adhesive or surface treatment.

The reinforcement layer 202 can include a fibrous reinforcement, such as a woven or nonwoven fibrous reinforcement. For example, the fibrous reinforcement can be a woven fabric or an intermeshing of random fibrous strands. In one exemplary embodiment, the fabric is a woven glass fabric. In other embodiments, the reinforcement can include a mesh of ceramic, plastic, or metallic material or sheets of composite materials, among others. Alternatively, the reinforcement layer 202 can take the form of a substrate, typically a sheet. Embodiments can use supports formed of high melting point thermoplastics, such as thermoplastic polyimides, polyetherether ketones, polyaryl ketones, polyphenylene sulfide, and polyetherimides; thermosetting plastics, particularly of the high temperature capable thermosetting resins, such as polyimides; coated or laminated textiles based on the above thermoplastics or similar thermally stable resins and thermally stable reinforcements such as fiberglass, graphite, and polyaramid; plastic coated metal foil; and metallized or metal foil laminated plastic films. In addition, exemplary embodiments include woven and non-woven materials formed of fibers selected from aramid, fluorinated polymer, fiberglass, graphite, polyimide, polyphenylene sulfide, polyketones, polyesters, or a combination thereof. In particular, the fibrous reinforcement includes a fiberglass reinforcement that has been cleaned or pretreated with heat. Alternatively, the fibrous reinforcement can be a coated fiberglass reinforcement. In a particular example, each of the fibers of the fiberglass can be individually coated with a polymeric coating, such as a fluoropolymer coating, for example, PTFE.

The layer 204 can include the blend described above in relation to layer 102 of FIG. 1. The layer 204 can be applied in an amount of at least 1.5 osy. Given that a woven fibrous reinforcement can undulate, the amount of the layer is provided in weight per area (ounces per square yard (osy)). For example, the layer can be applied in an amount of at least 1.8 osy, such as at least 2.0 osy, at least 4.0 osy, at least 4.5 osy, or even at least 6.0 osy. In general, the coating is applied in an amount not greater than 50 osy.

Figure 3:
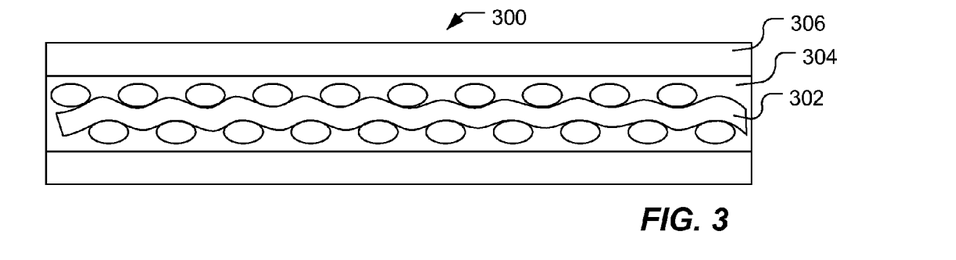

In a further embodiment, the blend of perfluoropolymer and silicone elastomer can be applied over a coated reinforcement. For example, as illustrated in FIG. 3, a sheet material 300 can include a reinforcement layer 302 that is coated with layer 304. The layer 304 can be further coated with a layer 306 that includes a blend of perfluoropolymer and silicone polymer, such as the blend described above.

The reinforcement layer 302 can be a fibrous woven or nonwoven reinforcement material, as described above in relation to layer 202 of FIG. 2. The fibrous reinforcement can be coated with a layer of perfluoropolymer, such as PTFE, FEP, PFA, or any combination thereof. For example, the layer 304 can be applied in an amount of at least 0.5 osy. For example, the layer 304 can be applied in an amount in a range of 0.5 osy to 2.5 osy, such as 0.5 osy to 2.0 osy, 0.5 osy to 1.5 osy, or 0.5 osy to 1.0 osy.

The layer 306 can be applied over and disposed on the layer 304. In particular, the layer 306 can directly contact the layer 304 absent any intervening layers, such as adhesive or surface treatment. The layer 306 includes a blend of perfluoropolymer and silicone polymer, such as the blend described above in relation to layer 102 of FIG. 1. In an example, the layer 306 is applied in an amount of at least 1.5 osy, such as at least 1.8 osy, or even at least 2.0 osy. In a particular example, the layer 306 can be applied in an amount of at least 4.0 osy, such as at least 6.0 osy, but in each case, the amount of layer 306 is not greater than 50 osy.

In a further embodiment, a top coat can be applied over the blend. For example, a sheet material 400 illustrated in FIG. 4 can include a structure similar to that described in relation to FIG. 3, including a reinforcement 402 coated with a perfluoropolymer layer 404, which is in turn coated with a polymer blend layer 406.

Figure 4:
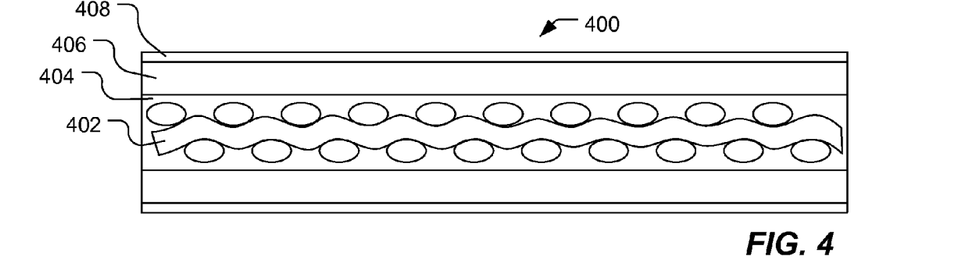

A further layer 408 can be applied over and disposed on the polymer blend layer 406, for example, directly contacting layer 406 without intervening layers. The additional layer 408 can be formed of a perfluoropolymer, such as PTFE, FEP, PFA, or any combination thereof. In particular, the further layer 408 can be applied in an amount in a range of 0.5 osy to 2.5 osy, such as a range of 0.5 osy to 2.0 osy, a range of 0.5 osy to 1.5 osy, or a range of 0.5 osy to 1.0 osy.

Alternatively, the layer 408 can include a hard silicone coating, such as a silicone coating having a durometer of at least about 90 as measured on a Shore A scale, or at least about 20, as measured on a Shore D scale. As a result, the layer 408 provides the surface of the sheet material 400 with desired non-tack and low friction properties. For example, the layer 408 can have hardness at least about 95, such as at least about 100 on the Shore A scale. In general, the layer 408 is relatively harder than the layer 406. Further, hardness can be modified by, for example, modification of cross-link density, incorporation of fillers, or any combination thereof.

Furthermore, one or more additional layers can be provided which can impart surface functionality to the sheet material. While each of the above embodiments illustrated in FIGS. 2-4 are symmetric about the reinforcement layers, the layers can alternatively be applied in an asymmetric form, wherein one or more of the layers can be absent from one of the sides or each of the layers can be applied in different thicknesses on different sides. The layers can be applied as fused layer or semifused layers. Semifused layers can be adhered to semifused layers of other films, substrates, fabrics, or sheets, and fused to bond the sheet material to the other material.

In an example, the total weight of the coated fabric can be at least 4.0 osy. For example, the total weight of the coated fabric can be at least 4.5 osy, such as at least 6.0 osy, or even at least 10 osy. In addition, the fabric can have a total thickness of at least 3.5 mils, such as at least 5.0 mils, or even at least 9 mils. In general, the fabric has a total weight of not greater than 60 osy and a thickness not greater than 100 mils.

In particular, the sheet material exhibits a desirable stiffness and hand which remarkably exhibits near isotropy with respect to the machine direction and the cross direction. For example, the sheet material can exhibit a Gurley stiffness in the machine direction of not greater than 550. In particular, the Gurley stiffness in the machine direction is not greater than 525, such as not greater than 500. In the cross direction, the Gurley stiffness is not greater than 800, such as not greater than 600, or even not greater than 500. More particularly, the coated fabric can have a Gurley Directional Ratio, defined as the ratio of the Gurley stiffness in the cross direction over the Gurley stiffness in the machine direction, of not greater than 1.3. For example, the Gurley Directional Ratio can be not greater than 1.1, such as not greater than 1.0.

Further, the sheet material exhibits desirable trapezoidal tear strength in both the machine direction and the cross direction. As with the Gurley stiffness, the trapezoidal tear strength in both the machine and cross directions is more closely matched. For example, the trapezoidal tear strength in the machine direction can be at least 13 lbs, such as at least 16 lbs, at least 22 lbs, or even at least 25 lbs. In a further example, the trapezoidal tear strength of the sheet material can be at least 11 lbs in the cross direction, such as at least 13 lbs, at least 16 lbs, or even at least 20 lbs. Trapezoidal tear strength is measured in accordance with ASTM D751 as modified by D4969. The Tear Directional Ratio, defined as the ratio of the trapezoidal tear strength in the cross direction over the trapezoidal tear strength in the machine direction is at least 0.77. For example, the Tear Directional Ratio can be at least 0.81, such as at least 0.85.

While the value of Gurley stiffness and trapezoidal tear strength can be influenced by the selection of a reinforcement layer, the sheet material exhibits an unexpected and desirable change in Gurley stiffness or trapezoidal tear strength relative to fabrics of similar weight formed from similar reinforcement and PTFE alone. For example, the Gurley stiffness can be at least 10% less than a PTFE coated fabric, such as at least 18% less, at least 25% less, or even at least 30% less. The percent decrease in Gurley stiffness relative to the reinforcement coated with PTFE alone is defined as the Gurley Index. Further, the trapezoidal tear strength can be at least 25% more than a PTFE coated fabric, such as at least 50% more, at least 70% more, or even at least 90% more. The increase in trapezoidal tear strength relative to the reinforcement coated with PTFE alone is defined as the Tear Index.

Further, the sheet material can exhibit a specular reflectance of not greater than 0.5%, such as not greater than 0.2%, as measured in accordance with ASTM E424. In addition, the surface can have a coefficient to friction of not greater than 0.2.

The sheet material can provide a cohesive structure that has a desirable coating adhesion as determined by ASTM D4851-88 modified by heating and pressing for as much as 2 minutes to form test samples and performing tests on samples 1" in width. For example, the coating adhesion can be at least 1.8 lbs/in, such as at least 2.0 lb/in, at least 2.5 lb/in, at least 3.0 lb/in, at least 3.5 lb/in, at least 4.0 lb/in, or even at least 4.5 lb/in.

In another example, the sheet material can have a warp break strength (break strength in the machine direction) of at least 270 lb/in, such as at least 290 lb/in, at least 300 lb/in, or even at least 350 lb/in. In addition, the sheet material exhibits a desirable fill break strength (break strength in the cross direction) of at least 200 lb/in, such as at least 230 lb/in, at least 250 lb/in, or even at least 270 lb/in. Strength is determined in accordance with ASTM D3751.

Advantageously, the sheet material exhibits improved break strength in the warp or machine direction relative to a comparable sheet material formed of a similar reinforcement and coated with an equivalent thickness of perfluoropolymer, such as PTFE. The Warp Strength Index, defined as the percent increase in warp break strength relative to the comparable sheet material, is at least 8%, such as at least 10%, at least 12%, or even at least 15%.

Further, the sheet material exhibits desirable retention of break strength when stressed through creasing or folding. Based on the Flex Fold test according to ASTM D3751 using a 10 lb roller, the sheet material retains a percentage of its warp break strength. The sheet material can exhibits a Strength Retention, defined as the warp break strength retained by a sample after undergoing a Flex Fold test expressed as a percentage of the original warp break strength prior to flexing, of at least 25%, such as at least 35%, or even at least 40%.

In an additional example, the sheet material also exhibits a desirable combination of cohesion and break strength. In contrast to other materials that exhibit a trade-off between cohesiveness (measured as coating adhesion) and break strength, the sheet material can exhibit both improved break strength and coating adhesion. As such, the sheet material can exhibit a Cohesive Ratio, defined as the warp break strength divided by the coating adhesion, of not greater than 142.5, such as not greater than 100, not greater than 85, or even not greater than 75.

In a further example, the sheet material exhibits low permeability. In particular, the sheet material is not porous or layers that may be porous, such as a layer comprising the perfluoropolymer/silicone blend, include pores that are not substantially interconnected or are localized to that layer. For example, the sheet material can have a permeability of not greater than 0.001 cuin/min, as measured in accordance with ASTM D737, such as having a permeability of approximately 0 cuin/min within the sensitivity of the measuring device. As such, the sheet material can be impermeable. In a particular example, a sheet material including a reinforcement layer and a layer comprising the fluoropolymer/silicone blend described above has a permeability of not greater than 0.001 cuin/min.

In an additional example, the sheet material exhibits low permeability when exposed to hydrocarbons and solvent. For example the vapor transmission rate (VTR) permeation when measured in accordance with ASTM D814 under exposure to Fuel B, is not greater than 2.0 mg/s*m$^2$, such as not greater than 1.5 mg/s*m$^2$, not greater than 1.0 mg/s*m$^2$, not greater than 0.5 mg/s*m$^2$, or even not greater than 0.3 mg/s*m$^2$.

To form the sheet material, a dispersion can be prepared including a blend of perfluoropolymer particles and precured silicone elastomer particles. For example, the dispersion can be an aqueous dispersion. In a particular example, a dispersion of perfluoropolymer, such as PTFE, is mixed with a dispersion of precured silicone polymer. The silicone polymer can form between 2 wt % and 30 wt % based on the solids of the dispersion. For example, the silicone polymer can form 5 wt % to 30 wt % of the solids of the dispersions, such as 10 wt % to 30 wt %, 10 wt % to 25 wt %, or even 15 wt % to 20 wt % of the solids of the dispersion. The perfluoropolymer can form the remainder of the solids of the dispersion. For example, the perfluoropolymer can form 70 wt % to 98 wt % of the solid content of the dispersion, such as 75 wt % to 90 wt % or even 80 wt % to 85 wt % of the solid content of the dispersion. Alternatively, a solid filler can be included in the dispersion. For example, the solid filler can form not greater than 60 wt % of the solids in the dispersion, such as not greater than 40 wt %, not greater than 15 wt %, or not greater than 5 wt %.

A carrier can be coated with the dispersion through a process, such as dip coating, knife coating, or casting. Excess material can be wiped and the coating dried and sintered or fused. For example, the carrier can be a solid material that can be separable from the sheet material. In such a case, the sheet material including a layer of the blend can be formed by first coating the carrier, drying and sintering the material, and separating the material from the carrier to form a sheet material. In such an example, the sheet material is free of a reinforcement layer.

In an alternative embodiment, the carrier can be a reinforcement material, which can be coated with the dispersion. The reinforcement material can be a fibrous reinforcement and in particular, can be a coated fibrous reinforcement. In a particular embodiment, the fibrous reinforcement, such as a fiberglass, can be drawn through an aqueous dispersion. To form an optional coating prior to coating with the blend, the aqueous dispersion can be a dispersion of perfluoropolymer absent the silicone. For example, the reinforcement material can be drawn through an aqueous dispersion of PTFE. The fibrous reinforcement coated with the aqueous dispersion is passed through a wiping arrangement to remove excess perfluoropolymer dispersion and is passed through an oven. The oven can be, for example, a three zone tower oven. In particular, the three zone tower oven can fuse the coated material. For example, the first zone can dry the dispersion at a temperature in a range of 200° F. to 300° F. The second zone can heat the deposited perfluoropolymer to remove surfactants and other additives. In particular, the second zone can heat the deposited perfluoropolymer at a temperature in a range of 500° F. to 600° F. The third zone can melt, sinter, or fuse the perfluoropolymer. For example, the third zone can fuse the perfluoropolymer at a temperature in the range of 680° F. to 700° F.

In another example, the three zone tower can be set to semifuse the coated material. For example, the first zone can dry the dispersion at a temperature in a range of 200° F. to 300° F. The second zone can heat the deposited perfluoropolymer to remove surfactants and other additives. In particular, the second zone can heat the deposited perfluoropolymer at a temperature in a range of 500° F. to 600° F. The third zone can be set to a temperature lower than the melting point of the perfluoropolymer. For example, the third zone can be set to a temperature in the range of 550° F. to 600° F.

To deposit the blended dispersion that includes perfluoropolymer and silicone elastomer, the process can be repeated. For example, the fibrous reinforcement, such as an uncoated fibrous reinforcement or the coated fibrous reinforcement, can be drawn through a bath of aqueous dispersion including the blend of perfluoropolymer and silicone elastomer. Excess dispersion can be removed using a wiping arrangement, such as a metering bar, a Bird bar, a wire-wound metering bar, a K bar, or other similar equipment or combinations thereof. The reinforcement material coated with the blended dispersion is heated. For example, the dispersion can be heated to dry the dispersion, remove surfactants or other additives and subsequently to melt the perfluoropolymer and cure the precured silicone polymer. In particular, the coated reinforcement material can pass through a three zone tower oven, including a first zone that dries the dispersion at a temperature in a range of 200° F. to 300° F. A second zone of the oven can remove surfactants and other additives from the deposited blend coating at a temperature in a range of 500° F. to 600° F. The third zone can be set to fuse the blend, for example, melt the perfluoropolymer, or can be set to form a semifused layer. For example, the third zone can be set to a temperature in a range of 680° F. to 700° F. to fuse the material. In another example, the third zone can be set to a temperature in a range of 550° F. to 600° F. to semifuse the layer. Alternatively, the coating can be heating in an oven including one zone, two zones, or more. In a particular example, the coating can be dried and sintered in two stages.

In addition, particularly when the outer layer is a semifuse layer, the sheet material can be pressed or calendered. In an example, the drums of the calender can be set to a temperature in a range of 275° F. to 400° F. and to a pressure between the drums in a range of 500 psi to 4000 psi. Subsequently, the calendered sheet material including the semifused layer or layers can be subjected to fusing conditions, such as a temperature within a range of 680° F. to 700° F.

Further, the sheet material can pass through a cooling plenum from which it can be directed to a subsequent dip pan to begin formation of a further layer of film, to a stripping apparatus, or to a roll for storage. In another embodiment, sheets of composite material are formed and subsequently layered over the reinforcement material. These sheets can be further processed to bond to the reinforcement material. For example, sheets of material can be laminated to the reinforcement material.

In a particular example, a reinforcement material can be passed through an emulsion of perfluoropolymer, such as PTFE, and fused. For example, the reinforcement material can be passed through the emulsion once. In another example, the reinforcement material can be passed through a second time, or optionally a third time, and fused. Each pass results in additional thickness referred to herein as a pass. Following the application of the perfluoropolymer layer, the sheet material can be passed through an emulsion including a blend of perfluoropolymer and silicone. The sheet material can be passed through the emulsion of the blend at least once. In particular, the sheet material can be passed through the emulsion of the blend twice or can be passed through the emulsion three or more times. Following coating of the blend over the sheet material, the blend layer can be fused. Alternatively, the blend layer can be semifused, as described above, and can be calendered, pressed, or further treated, and subsequently fused.

Optionally additional layers can be applied. For example, an additional layer or layers can be coated on the sheet material by passing the sheet material through an additional emulsion. In an example, the additional emulsion can be a perfluoropolymer emulsion. In another example, the additional emulsion can be a silicone emulsion. Passes underlying the additional layers can be fused or semifused when the additional layer is coated. The additional layer or layers can be fused, or can be semifused. The additional layer or layers can be calendered or otherwise treated.

In a particular example, a semifused layer, either the blend layer or an additional layer can be pressed into contact with another semifused layer of another sheet material or film. In an example, the construct can be fused to bond the sheet materials or sheet material and film together. For example, an additional semifused PTFE outer layer can be pressed or calendered into contact with a semifused PTFE layer of a second sheet material or film and subsequently fused. In another example, a semifused blend layer can be placed in contact with a semifused blend layer or semifused perfluoropolymer layer of a second sheet material or film, and subsequently fused.

In a particular embodiment, the sheet material includes a reinforcement material coated with a single pass of perfluoropolymer, such as PTFE, that is coated with at least one pass and likely two passes of a blend. Each of the layers can be fused. Alternatively, the passes of the blend can be semifused, calendered, and subsequently, fused. In another embodiment, the sheet material includes the reinforcement material, a pass of fused perfluoropolymer, two passes of fused blend, and an outer layer formed of at least one pass of a polymer, such as a perfluoropolymer or a silicone polymer. In an example, the outer layer is fused. In another example, the outer layer is semifused.

In a further embodiment, an outer layer that is semifused or a blend layer that is semifused can be placed in contact with a film, such as a film including perfluoropolymer or silicone. In an example, the film is a defect free perfluoropolymer film, such as a PTFE film. In an example, a film has a more uniform consistency than a coating and lower variability in properties. An example of a film includes a skived film, a cast film, or an extruded film.

Remarkably, it has been discovered that the dispersion including the blend of perfluoropolymer and silicone polymer permits thicker coatings to be applied in a single pass. For example, in a single pass, a dispersion of the blend can be coated to form a coating having a weight of at least 1.5 osy, such as at least 1.8 osy, at least 2.0 osy, or even at least 2.4 osy. Generally, coatings of PTFE when coated to form layers of weight greater than 1.0 osy form cracks, deformations or surface irregularities unless the coating is performed in multiple passes.

Figure 5:
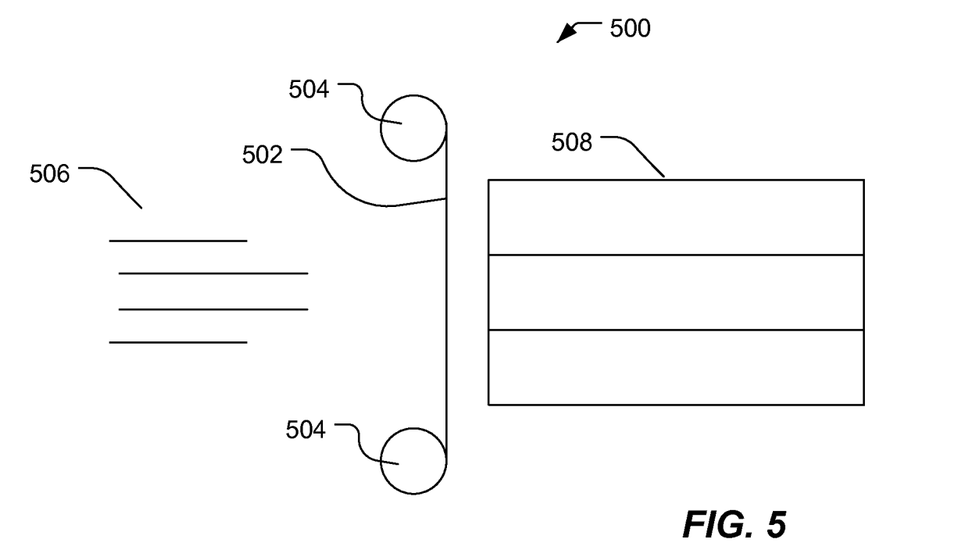
FIG. 5 and FIG. 6 include illustrations of exemplary automobile HVAC systems.
Figure 6:
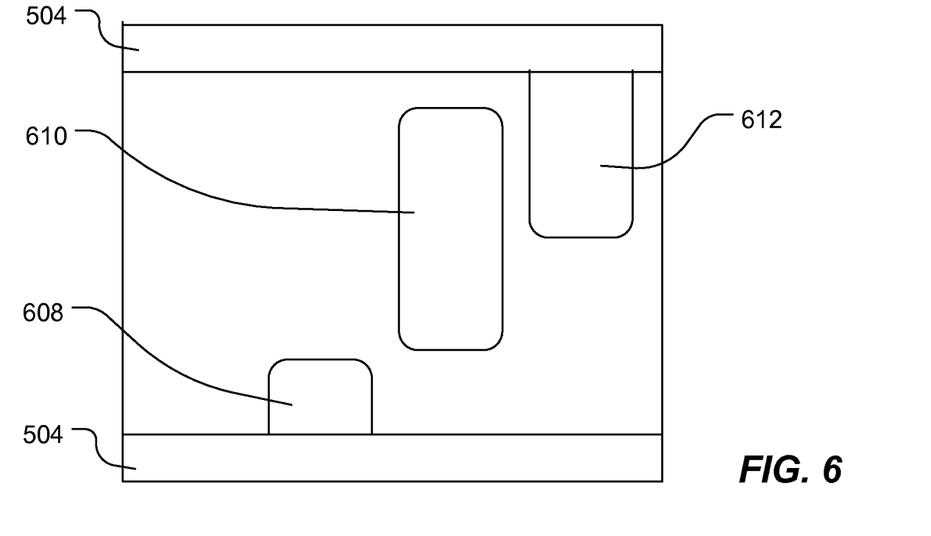

The coated fabric formed through such a process and as described above in relation to the FIGS. 1-4 is particularly well suited for use in automobile HVAC film valves. For example, as illustrated in FIG. 5 and FIG. 6, a sheet material 502 formed as described above can be particularly well suited as a film valve. For example, in the automobile HVAC system 500 illustrated in FIG. 5, the film valve can extend between rollers 504. A film valve 502 can be drawn between rollers 504 to align holes 608, 610, and 612 as illustrated at FIG. 6 with vents 508. Depending on the alignment of the holes 608, 610, and 612 with the vents 508, a source of air, such as a fan, can direct air through the film valve 502 and into one or more of the vents 508.

Advantageously, embodiments of the sheet material described above exhibit desirable flexibility and hand as well as other desirable features which make the sheet material particularly well suited for use in automobile HVAC systems. In addition, embodiments of the sheet material have greater sound absorption than a PTFE coated fabric having the same reinforcement.

In a particular example, the sheet material exhibits desirable properties, including breaking strength and crease and tear strength resistance, as well as, conformability, which enhance the useful life of the material. As such, the sheet material is particularly suited for use as a high temperature release sheet or as a belt in industrial applications.

For example, in photovoltaic lamination, the release fabric (whether in sheet or belt form) is forced to conform somewhat to the irregular contours of the photovoltaic cell through vacuum or mechanical pressure. Such forced conformation can cause the photovoltaic material to distort, which can cause creases that lead to defects in the photovoltaic cells being produced. Additionally, the conventional material can be severely weakened after repeated pressing cycles and can fail to due breaking or tearing. The present sheet material withstands repeated press cycles until loss of release properties, and not from mechanical failure. The enhanced physical properties allow the release fabric to remain in place longer, reducing the number of change outs due to premature failure.

In addition, release applications rely on the physical properties of the reinforcing material as much as the non-stick property of the perfluoropolymer. Such applications include other laminating or pressing operations in textiles, automotive and general industrial applications. Sealing of plastic packaging, whether rigid shapes like battery packages or thin flexible films that encase toilet paper and paper towels benefit from the high improved tensile strength, higher crease and tear resistance strength as well as the improved conformability of the present sheet material, as the release sheets and belting products through which heat is applied to form or seal these materials conform to irregular shapes and materials of various hardness (i.e., the core in the toilet paper or paper towel relative to the toilet paper itself). Additionally, adhesive backed pressure sensitive tape products are used in similar applications, and often conform to irregular heat sealing jaws, wires or molds. In contrast to conventional sheet materials, the present sheet material is useful in applications where the release fabric or tape is not kept in a planar shape. In such applications, the present sheet material exhibits increased useful release life.

In a further example, the present sheet material can be useful in insulator jacketing, bladder applications, expansion joints, HVAC control films, photovoltaic release sheets, and floating roof seals. Embodiments including food grade silicone can also be used in the food and food services industries, for example, as spill mats or industrial cooking belts, among other food preparation apparatuses.

EXAMPLES

Example 1

A sample of industry-style 1080 fiberglass fabric, greige finish, weighing 1.38 ounces per square yard (osy) after heat cleaning, with thickness of 2.1 mils, is lightly coated with fused PTFE resin by drawing the fabric through a bath of PTFE aqueous dispersion, DuPont TE-3859, reduced with water to 1.25 specific gravity. The coated fabric is passed through a wiping arrangement to remove excess PTFE dispersion and is passed through a three-zone tower oven, which in the first zone dries the dispersion at a temperature in a range of 200° F. to 300° F., in the second zone heats the deposited PTFE resin at a temperature in a range of 500° F. to 600° F., and in the third zone melts the PTFE at a temperature in a range of 680° F. to 700° F. The coated fabric weighs about 2.02 osy.

A second coating from a dispersion mixture of the DuPont TE-3859 PTFE dispersion and a silicone rubber dispersion, Wacker Silicones Finish CT27E (Wacker Silicones, Adrian, Mich.) is coated on to the coated fabric by drawing the coated fabric through the dispersion and wiping excess dispersion from the coated fabric. The dispersion mixture is made by combining by simple stirring about 131 parts by weight (pbw) of the DuPont TE-3859 with about 31 pbw of the Wacker CT27E. The mixture is not reduced with water.

The coating, comprising about 80 weight percent of PTFE and 20 weight percent of silicone rubber, is applied using the process described above, except that the wiping arrangement was modified to allow a greater weight of the coating formulation to be applied. The subsequent total weight of the coated fabric is 4.24 osy and is 0.0035 inches thick.

A second sample is prepared using a similar, two-step process, with an industry style 2116 fiberglass fabric, greige finish, weighing after heat cleaning 3.13 osy, with 3.7 mils thick. The intermediate PTFE-coated fabric weighs about 3.79 osy and the finished product weighs about 6.24 osy. The finished product is about 0.0052 inches thick.

The two samples are measured for finished thickness, finished weight, and coefficient of friction. In addition, the two samples are tested for break strength, load, trapezoidal tear strength, and coating adhesion, as illustrated in Table 1.

TABLE 1

Properties of Coated Fabric

| Property/attribute | Units | Sample 1 | Sample 2 |
|---|---|---|---|
| Finished thickness | mil | 3.5 | 5.2 |
| Finished weight | osy | 4.2 | 6.2 |
| Breaking strength, warp | lbf/in | 110 | 130 |
| Load at 2% elongation, warp | lbf/in | 65 | 63 |
| Trap tear, fill | lbf | 4.2 | 4.7 |
| Coefficient of friction | | 0.16 | 0.16 |
| Coating adhesion | lb/in | 3.3 | 2.1 |

Example 2

An additional sample is prepared using the method described in Example 1. The base fabric is an industrial style 7628 fiberglass fabric having a standard weight of 5.94 osy after cleaning. An initial coating of PTFE is applied as described in relation to Example 1. The blend coating composition described above is applied in three passes. The weight of the fabric prior to application of the blend coating is 7.3 osy and following each of the three passes is 9.06 osy, 11.57 osy, and 12.39 osy, respectively. The final thickness of the film is 0.0103 in.

The sample (Sample 3) is compared to a standard 10 mil PTFE film (PTFE CF210) based on the same base fabric. The sample and comparative sample are tested for Gurley stiffness, trapezoidal tear strength (ASTM D751), and specular reflectance (ASTM E424).

TABLE 2

Comparative Testing of Samples

| | PTFE CF210 | Sample 3 | % Change |
|---|---|---|---|
| Gurley Stiffness Mach. Dir. | 607 | 490 | −19.2 |
| Gurley Stiffness Cross Dir. | 940 | 477 | −49.2 |
| Trap. Tear Mach. Dir. (lbs) | 14.7 | 25.7 | 74.8 |
| Trap Tear Cross Dir. (lbs) | 10.8 | 22.5 | 100.8 |
| Specular Reflectance (%) | 0.99 | 0.05 | −94.9 |

In addition to exhibiting lower Gurley stiffness in both directions relative to the comparative sample, the blend sample exhibits a lower difference between stiffness in machine versus cross directions. In particular, the Gurley Directional Ratio is less than 1.0, i.e., 0.97, whereas the comparative sample exhibits a Gurley Directional Ratio significantly greater than 1.0. Similarly, the tear strength of the sample is higher than that of the comparative sample and the ratio between the directions is closer to 1. The specular reflectance of the blend sample is lower. Additional coatings can be used to manipulate the reflectance.

While the value of the Gurley stiffness and the trapezoidal tear strength can be influenced by the 7628 fiberglass fabric, the change relative to the PTFE coated fabric and the directional ratios represent an unexpected and desirable improvement.

Example 3

Samples and comparative samples are prepared using an industrial standard 1528 fiberglass fabric. The samples are coated in passes that are fused. The samples and comparative samples are tested for mechanical properties, including machine direction trapezoidal tear strength, cross direction trapezoidal tear strength, warp (machine direction) break strength, fill (cross direction) break strength, strength retention, and coating adhesion.

Comparative samples (Comparative Samples 1 and 2) are prepared by repeated passes of the 1528 fiberglass fabric through a PTFE emulsion to form a sheet material having a weight of 13.5 osy. The PTFE coating is fused.

A first sample (Sample 4) is prepared by applying a single fused pass of clear PTFE to the 1528 fiberglass fabric, followed by two semifused passes of a blend of PTFE and 20 wt % silicone, formed as describe in relation to Example 1. After application of the semifused passes, the blend layer is fused. A single pass of fused PTFE is applied over the blend layer.

A second sample (Sample 5) includes the 1528 fiberglass fabric and a pass of fused clear PTFE, coated with three passes of semifused blend including 10% silicone. The semifused passes are fused to form a blend layer that is subsequently coated with a fused clear PTFE layer.

A third sample (Sample 6) includes the 1528 fiberglass fabric and two passes of fused clear PTFE, coated with two passes of semifused blend including 20% silicone. The semifused passes are calendered and fused to form a blend layer that is subsequently coated with a fused clear PTFE layer.

A fourth sample (Sample 7) includes the 1528 fiberglass fabric and two passes of fused clear PTFE, coated with two passes of semifused blend including 20% silicone. The semifused passes are calendered and fused to form a blend layer that is subsequently coated with a fused clear PTFE layer. The sample is further subjected to an additional calendering.

A fifth sample (Sample 8) includes the 1528 fiberglass fabric and a single pass of fused clear PTFE, coated with two passes of semifused blend including 20% silicone. The semifused passes are coated with a semifused clear PTFE layer. The material is subjected to calendering, followed by fusing. An additional clear PTFE pass is fused to the material.

Table 3 illustrates the weight and mechanical properties of the samples and comparative samples. As illustrated, the samples exhibit desirable improvement in break strength. In addition, the samples exhibit a desirable Cohesion Ratio and Strength Retention.

TABLE 3

Properties of Samples including 1528 Fiberglass Fabric

| Property | | C1 | C2 | 4 | 5 | 6 | 7 | 8 |
|---|---|---|---|---|---|---|---|---|
| Weight | osy | 13.5 | 13.5 | 13.9 | 13.0 | 13.7 | 13.7 | 14.6 |
| Thickness | mil | 10 | 10 | 10 | 9.8 | 10 | 10 | 10 |
| Warp Trap Tear | lb | 14.9 | 13.0 | 16.3 | 14.2 | 14.7 | 13.7 | 13.7 |
| Fill Trap Tear | lb | 13.8 | 13.7 | 16.3 | 11.5 | 12.8 | 12.9 | 11.4 |
| Warp Break Strength | lb/in | 262 | 243 | 294.6 | 294.7 | 300.7 | 290.7 | 277.8 |
| Strength Retention | % | N/A | N/A | 36.8 | 40.9 | 41.5 | 34.0 | 26.2 |
| Coating Adhesion | lb/in | 1.7 | 1.7 | 3.68 | 4.77 | 4.84 | 4.67 | 3.83 |
| Cohesion Ratio | | 154 | 143 | 80 | 62 | 62 | 62 | 72 |

Example 4

Samples and comparative samples are prepared using an industrial standard 7628 fiberglass fabric. The samples are coated in passes that are fused. The samples and comparative samples are tested for mechanical properties, including machine direction trapezoidal tear strength, cross direction trapezoidal tear strength, warp (machine direction) break strength, fill (cross direction) break strength, strength retention, and coating adhesion.

Comparative samples (Comparative Samples 3 and 4) are prepared by repeated passes of the 7628 fiberglass fabric through a PTFE emulsion to form a sheet material having a weight of 12.7 osy. The PTFE coating is fused.

A first sample (Sample 9) is prepared by applying two pass of clear PTFE that are fused to the 7628 fiberglass fabric, followed by three semifused passes of a blend of PTFE and 20 wt % silicone. After application of the semifused passes, the blend layer is fused. A single pass of fused PTFE is applied over the blend layer.

A second sample (Sample 10) includes the 7628 fiberglass fabric and a pass of fused clear PTFE, coated with two passes of semifused blend including 20 wt % silicone. The semifused passes coated with a semifused clear PTFE layer and calendered. The calendered sheet material is fused, followed the application of a fused clear PTFE pass.

Table 4 illustrates the weight and mechanical properties of the samples and comparative samples. As illustrated, the samples exhibit a desirable break strength and desirable Strength Retention and Cohesion Ratio.

TABLE 4

Properties of Sheet Materials having 7268 Fiberglass Fabric

| Property | | C3 | C4 | 9 | 10 |
|---|---|---|---|---|---|
| Weight | osy | 12.7 | 12.7 | 13.9 | 13.6 |
| Thickness | mil | 9.7 | 9.7 | 10 | 10 |
| Warp Trap Tear | lb | 26.0 | 26.4 | 25.8 | 21.2 |
| Fill Trap Tear | lb | 21.0 | 21.4 | 21.7 | 21.1 |
| Warp Break Strength | lb/in | 347 | 421 | 424 | 360 |
| Strength Retention | % | N/A | N/A | 42.2 | 38.0 |
| Coating Adhesion | lb/in | 3.0 | 3.0 | 2.98 | 2.53 |
| Cohesion Ratio | | 115 | 140 | 143 | 142 |

Example 5

Samples are prepared using a 7628 fiberglass fabric or a 1564 fiberglass fabric. To the fiberglass fabric, a clear PTFE coating is applied and fused, followed by a single pass coating of a blend including 20 wt % silicone and PTFE, which is semifused. A 1 mil PTFE film is laminated to the semifused blend layer and the construction is fused.

Example 6

Samples are prepared using a 7628 fiberglass fabric or a 1528 fiberglass fabric. To the fiberglass fabric, a clear PTFE coating is applied and fused, followed by two pass coating of a blend either including 5 wt % or 10 wt % silicone and PTFE, which is subsequently fused. A pass of clear PTFE is applied on the blend layer and fused.

Example 7

Samples are formed in accordance with Example 5. Sample 11 includes a 7628 greige fiberglass fabric, and Sample 12 includes a 1564 greige fiberglass fabric. Properties of the samples are compared with those of CPI-10 42.5" (C5) and CPI-18 42.5" (C6), both available from Saint-Gobain. Table 5 illustrates the properties.

TABLE 5

Properties of Laminated Samples

| | | Sample 11 | | | C5 | Sample 12 | | | C6 |
|---|---|---|---|---|---|---|---|---|---|
| | | Before | After | PQD | | Before | After | PQD | |
| Weight | oz/sq yd | 13.68 | 13.78 | 14.5 | | 23.99 | 24.31 | 22.5 | |
| Thickness | mils | 10.7 | 10.7 | 10.5 | | 21.0 | 20.5 | 19.0 | |
| Ultimate Tensile (W) | PLI | 352 | 361 | 325 | | 531 | 524 | N/A | |
| Elongation (W) | % | 6 | 6 | N/A | | 6 | 6 | N/A | |
| Ultimate Tensile (F) | PLI | 265 | 253 | 225 | | 494 | 506 | N/A | |
| Elogation (F) | % | 5 | 5 | N/A | | 10 | 10 | N/A | |
| Trap Tear (W) | Lbs | 26.9 | 27.3 | 23 | | 56.1 | 55.2 | 40 | |
| Trap Tear (F) | Lbs | 28.7 | 25.6 | 23 | | 59.0 | 59.8 | 50 | |
| VTR (Fuel B) Permeation/ASTM D814 | mg/s*m$^2$ | <1.0 | <1.0 | <1.0 | | <0.3 | <0.3 | <0.3 | |
| Temperature (Top Range) | ° F. | 450 | 450 | 500 | | 450 | 450 | 500 | |

W-Warp, F-Fill

As is illustrated in Table 5, Samples 11 and 12 exhibit low permeation when exposed to Fuel B. In addition, Samples 11 and 12 exhibit desirable mechanical properties relative to the comparative samples.

In a particular embodiment, a coated fabric includes a reinforcement, a first coating disposed on the reinforcement, and a second coating disposed on the first coating. The first coating includes perfluoropolymer. The second coating includes perfluoropolymer and a silicone polymer in an amount in a range of 2 wt % to 30 wt %. In an example, the range of silicone polymer is 10 wt % to 25 wt %, such as 15 wt % to 20 wt %.

In an example, the coated fabric can include a third coating on the second coating. The third coating can include a fluoropolymer, such as a perfluoropolymer. In another example, the third coating can include silicone.

In a further example, the coated fabric has a Gurley stiffness in the machine direction of not greater than 550, such as not greater than 525, or not greater than 500. In an additional example, the coated fabric has a Gurley stiffness in the cross direction of not greater than 800, such as not greater than 600, or not greater than 500. In addition, the coated fabric can have a Gurley Directional Ratio of not greater than 1.3, such as not greater than 1.1, or not greater than 1.0.

In a further example, the coated fabric has a trapezoidal tear strength in the machine direction of at least 13 lbs, such as at least 16 lbs, at least 20 lbs, at least 22 lbs, or at least 25 lbs. In another example, the coated fabric has a trapezoidal tear strength in the cross direction of at least 11 lbs, such as at least 13 lbs, at least 16 lbs, or at least 20 lbs. In addition, the coated fabric can have a Tear Directional Ratio of at least 0.77, such as at least 0.81, or at least 0.85. Further, the coated fabric can exhibit a Tear Index of at least 25%.

In an additional example, the coated fabric has a specular reflectance of not greater than 0.5%, such as not greater than 0.2%. Further, the coated fabric can have a coefficient of friction of not greater than 0.2. In addition, the coated fabric can have a coating adhesion of at least 1.8 lb/in, such as at least 2.0 lb/in, or at least 2.5 lb/in.

In another example, the coated fabric can have a warp break strength of at least 270 lb/in, such as at least 290 lb/in. Further, the fill break strength can be at least 200 lb/in. The coated fabric can exhibit a Strength Retention of at least 25%, such as at least 35%. In addition, the coated fabric can exhibit a Cohesion Ratio of not greater than 142.5, such as not greater than 100.

In an example, the perfluoropolymer includes PTFE, HFP, FEP, PFA, or a combination thereof. In a particular example, the perfluoropolymer includes polytetrafluoroethylene. In a further example, the silicone polymer is derived from a pre-cured silicone polymer dispersion, such as a condensation polymerized silicone.

In a particular example, the first coating is applied in an amount of at least 0.5 osy. In another example, the second coating is applied in an amount of at least 1.5 osy, such as at least 1.8 osy, at least 2.0 osy, or at least 2.4 osy. The total weight of the coated fabric can be at least 4.0 osy, such as at least 4.5 osy, or at least 6.0 osy.

In another embodiment, a sheet material includes a blend of perfluoropolymer and silicone polymer. The blend includes the silicone polymer in an amount in a range of 2 wt % to 30 wt %. The sheet material has a Gurley Directional Ratio of not greater than 1.3.

In a further embodiment, a sheet material includes a blend of perfluoropolymer and silicone polymer. The blend includes the silicone polymer in an amount in a range of 2 wt % to 30 wt %. The sheet material has a Tear Directional Ratio of at least 0.77.

In an additional embodiment, a sheet material includes a blend of perfluoropolymer and silicone polymer. The blend includes the silicone polymer in an amount in a range of 2 wt % to 30 wt %. The sheet material has a total thickness of at least 9 mils and a Gurley stiffness of not greater than 550.

In another embodiment, a venting system includes a plurality of conduits, each having an opening, and includes a film having a plurality of openings. The film is movable to align at least one opening with an opening of at least one of the conduit of the plurality of conduits. The film includes a blend of perfluoropolymer and silicone polymer. The blend includes the silicone polymer in an amount in a range of 2 wt % to 30 wt %.

In a further embodiment, a method of forming a sheet material includes coating a reinforcement with a first coating comprising a perfluoropolymer to form a first intermediate article, coating the first intermediate article with a second coating comprising a polymer dispersion to form a second intermediate article, and sintering the second intermediate article. The polymer dispersion includes a perfluoropolymer and a silicone polymer. The dispersion includes the silicone polymer in an amount in a range of 2 wt % to 30 wt % based on the total weight of solids in the polymer dispersion.

In an example, coating the first intermediate article with the second coating includes coating the first intermediate article with at least 2.0 osy of the second coating in a single step. In a further example, coating the first intermediate article with the second coating includes coating the first intermediate article with at least 2.4 osy of the second coating in a single step.

In an additional embodiment, a method of forming a sheet material includes coating a carrier with at least 2.0 osy of a polymer dispersion comprising a perfluoropolymer and a silicone polymer. The silicone polymer forms 2 wt % to 30 wt % of the solids content of the dispersion. The method further includes drying the polymer dispersion and sintering the dried polymer dispersion.

In an example, the carrier forms a carrier web reinforcement that is incorporated into the sheet material. In a further example, the carrier comprises a fibrous reinforcement material. In an additional example, the carrier includes a fibrous reinforcement material coated with a perfluoropolymer. In another example, the carrier is a support separable from the coating and the method further includes delaminating the coating from the carrier.

In a further embodiment, a sheet material includes a polymer blend comprising perfluoropolymer and silicone polymer. The polymer blend includes the silicone polymer in an amount in a range of 2 wt % to 30 wt %. In an example, the sheet material further includes a reinforcement layer, the polymer blend disposed on the reinforcement layer. In an additional example, the reinforcement layer comprises a fibrous reinforcement material. Further, the reinforcement layer can include a fibrous reinforcement material coated with a perfluoropolymer.

In a further embodiment, a coated fabric includes a reinforcement material; and a coating overlying the reinforcement material. The coating includes perfluoropolymer and a silicone polymer in an amount in a range of 2 wt % to 30 wt %. The coated fabric has a permeability of not greater than 0.001 cuin/min. In an example, the coated fabric is substantially impermeable.

In an example, the range of silicone polymer is 10 wt % to 25 wt %, such as 15 wt % to 20 wt %. In another example, the coated fabric has a trapezoidal tear strength in the machine direction of at least 13 lbs. In a further example, the coated fabric has a coating adhesion of at least 1.8 lb/in. In an additional example, the coated fabric exhibits a Strength Retention of at least 25%.

In a particular example, the perfluoropolymer includes polytetrafluoroethylene (PTFE), hexafluoropropylene (HFP), fluorinated ethylene propylene (FEP), perfluoroalkyl vinyl ether (PFA), a combination thereof. For example, the perfluoropolymer includes polytetrafluoroethylene (PTFE). The silicone polymer can be derived from a precured silicone polymer dispersion. In particular the silicone can be a condensation polymerized silicone.

In another embodiment, a sheet material includes a single layer. The single layer includes a polymer blend comprising perfluoropolymer and silicone polymer. The polymer blend includes the silicone polymer in an amount in a range of 2 wt % to 30 wt %.

In an additional embodiment, a method of forming a coated fabric includes dispensing a fabric and applying a first emulsion coating to the fabric. The first emulsion includes a perfluoropolymer. The method also includes fusing the first emulsion coating to form a first layer and applying a second emulsion coating on the first emulsion coating. The second emulsion coating includes a blend of perfluoropolymer and silicone polymer in an amount in a range of 2 wt % to 30 wt %. The method further includes fusing the second emulsion coating to form a second layer.

In an example, the method further includes semifusing the second emulsion coating following applying the second emulsion coating and prior to fusing the second emulsion coating. In addition, the method can further include calendering the second emulsion coating following semifusing the second emulsion coating. Further, the method can include contacting the second emulsion coating with a perfluoropolymer film following semifusing the second emulsion coating, wherein fusing the second emulsion coating includes fusing the second emulsion coating while in contact with the perfluoropolymer film.

In another example, the method further includes applying a third emulsion coating on the second emulsion coating. In an example, the third emulsion coating includes a perfluoropolymer. In another example, the third emulsion coating includes silicone.

Further, the method can include semifusing the third emulsion coating, contacting the third emulsion coating with a film, and fusing the third emulsion coating while in contact with the film. The method can also include semifusing the third emulsion coating, calendering the third emulsion coating, and fusing the third emulsion coating. In addition, applying the third emulsion coating can include applying the third emulsion coating to the second emulsion coating while the second emulsion coating is in a semifused state.

As used herein, the terms "over" or "overlie," when used in relation to location indicate a location relatively closer to an outer surface of the sheet material when moving away from reinforcement material, if any.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is clamied is:

1. A coated fabric comprising:
   a reinforcement;
   a first coating on the reinforcement, the first coating comprising perfluoropolymer;
   a second coating on the first coating, the second coating comprising perfluoropolymer and a silicone polymer in an amount in a range of 2 wt % to 30 wt %; and
   a third coating on the second coating.

2. The coated fabric of claim 1, wherein the range of silicone polymer is 10 wt % to 25 wt %.

3. The coated fabric of claim 1, wherein the third coating comprises fluoropolymer.

4. The coated fabric of claim 1, wherein the third coating comprises silicone.

5. The coated fabric of claim 1, wherein the coated fabric has a trapezoidal tear strength in the machine direction of at least 13 lbs.

6. The coated fabric of claim 1, wherein the coated fabric has a trapezoidal tear strength in the cross direction of at least 11 lbs.

7. The coated fabric of claim 1, wherein the coated fabric has a Tear Directional Ratio of at least 0.77.

8. The coated fabric of claim 1, wherein the coated fabric has a coating adhesion of at least 1.8 lb/in.

9. The coated fabric of claim 1, wherein the coated fabric exhibits a fill break strength of at least 200 lb/in.

10. The coated fabric of claim 1, wherein the coated fabric exhibits a Strength Retention of at least 25%.

11. The coated fabric of claim 1, wherein the coated fabric exhibits a Cohesion Ratio of not greater than 142.5.

12. The coated fabric of claim 1, wherein the coated fabric has a specular reflectance of not greater than 0.5%.

13. The coated fabric of claim 1, wherein the perfluoropolymer comprises polytetrafluoroethylene (PTFE), hexafluoropropylene (HFP), fluorinated ethylene propylene (FEP), perfluoroalkyl vinyl ether (PFA), or any combination thereof.

14. The coated fabric of claim 1, wherein the silicone polymer is derived from a precured silicone polymer dispersion.

15. The coated fabric of claim 1, wherein the second coating is applied in an amount of at least 1.5 osy.

16. The coated fabric of claim 1, wherein the total weight of the coated fabric is at least 4.0 osy.

17. A coated fabric comprising:
    a reinforcement;
    a first coating on the reinforcement, the first coating comprising perfluoropolymer; and
    a second coating on the first coating, the second coating comprising a polymer blend comprising a perfluoropolymer and 2wt % to 30wt % of a silicone polymer, or a perfluoropolymer, 2wt % to 30wt % of a silicone polymer, and a filler, wherein the reinforcement is a woven glass fabric and has two opposing major surfaces, the first coating overlies the two opposing major surfaces of the reinforcement layer and has two opposing major surfaces facing away from the reinforcement layer, and the second coating overlies the two opposing major surfaces of the first coating.

18. The coated fabric of claim 17, wherein the perfluoropolymer is selected from the group consisting of polytetrafluoroethylene (PTFE), hexafluoropropylene (HFP), fluorinated ethylene propylene (FEP), perfluoroalkyl vinyl ether (PFA), and any combination thereof.

19. The coated fabric of claim 17, further comprising a third coating comprising a silicone.

20. The coated fabric of claim 17, wherein the perfluoropolymer comprises polytetrafluoroethylene (PTFE), hexafluoropropylene (HFP), fluorinated ethylene propylene (FEP), perfluoroalkyl vinyl ether (PFA), or any combination thereof.

21. The coated fabric of claim 17, wherein the silicone polymer is derived from a precured silicone polymer dispersion.

\* \* \* \* \*